(12) United States Patent
Holden et al.

(10) Patent No.: US 7,475,095 B2
(45) Date of Patent: Jan. 6, 2009

(54) UNREAD MARK REPLICATION BOUNCE-BACK PREVENTION

(75) Inventors: Russell L. Holden, Westford, MA (US); William A. Spencer, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 10/737,341

(22) Filed: Dec. 16, 2003

(65) Prior Publication Data

US 2005/0131967 A1 Jun. 16, 2005

(51) Int. Cl.
G06F 12/00 (2006.01)

(52) U.S. Cl. .................. 707/201; 707/202; 707/203; 711/161

(58) Field of Classification Search ............. 707/1–100, 707/200–204; 711/161, 162
See application file for complete search history.

(56) References Cited

U.S. PATENT DOCUMENTS

| | | | | |
|---|---|---|---|---|
| 5,765,171 A | * | 6/1998 | Gehani et al. | 707/203 |
| 5,819,272 A | * | 10/1998 | Benson | 707/8 |
| 5,991,771 A | * | 11/1999 | Falls et al. | 707/202 |
| 6,122,630 A | * | 9/2000 | Strickler et al. | 707/8 |
| 6,453,326 B1 | * | 9/2002 | Parham et al. | 707/204 |
| 6,789,255 B1 | * | 9/2004 | Pedrizetti et al. | 717/169 |
| 2002/0065827 A1 | * | 5/2002 | Christie et al. | 707/10 |
| 2004/0221019 A1 | * | 11/2004 | Swildens et al. | 709/217 |
| 2006/0059208 A1 | * | 3/2006 | Chen et al. | 707/201 |

* cited by examiner

*Primary Examiner*—John Cottingham
*Assistant Examiner*—Robert Timblin
(74) *Attorney, Agent, or Firm*—Steve Kurlowecz; Hoffman Warnick LLC

(57) ABSTRACT

Under the present invention, a method, system, and program product for preventing an unread activity from being sent back (i.e., bounced-back) to its originating server during a replication operation are provided. The method includes: storing an identification of an originating server of a replicated unread activity, the unread activity being associated with a read/unread status of an email, in an unread log of a receiving server; during a subsequent replication process initiated by the receiving server, preventing replication of the unread activity back to the originating server; during the subsequent replication process, replicating the unread activity to at least one other server; and storing the identification of the originating server with the unread entry.

6 Claims, 5 Drawing Sheets

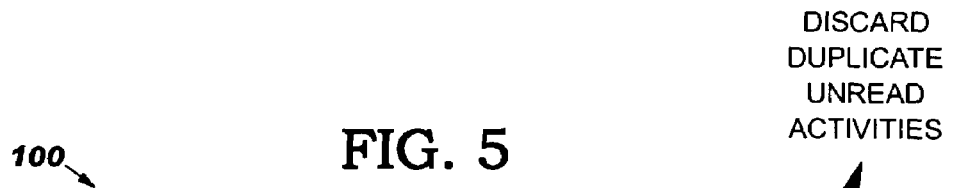
FIG. 5
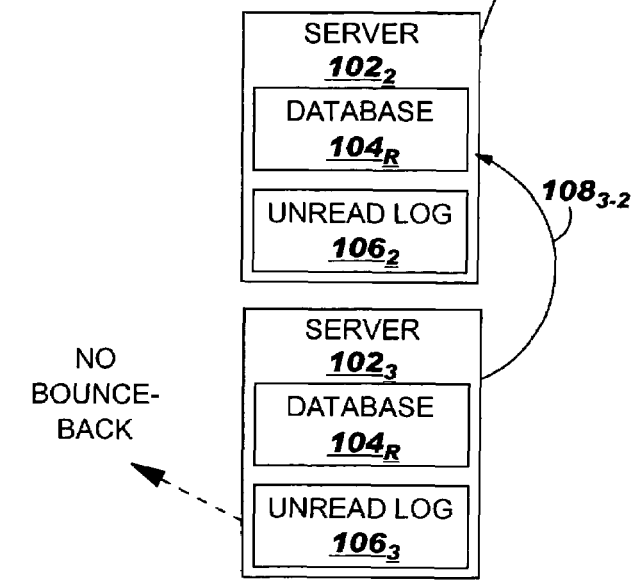
FIG. 6
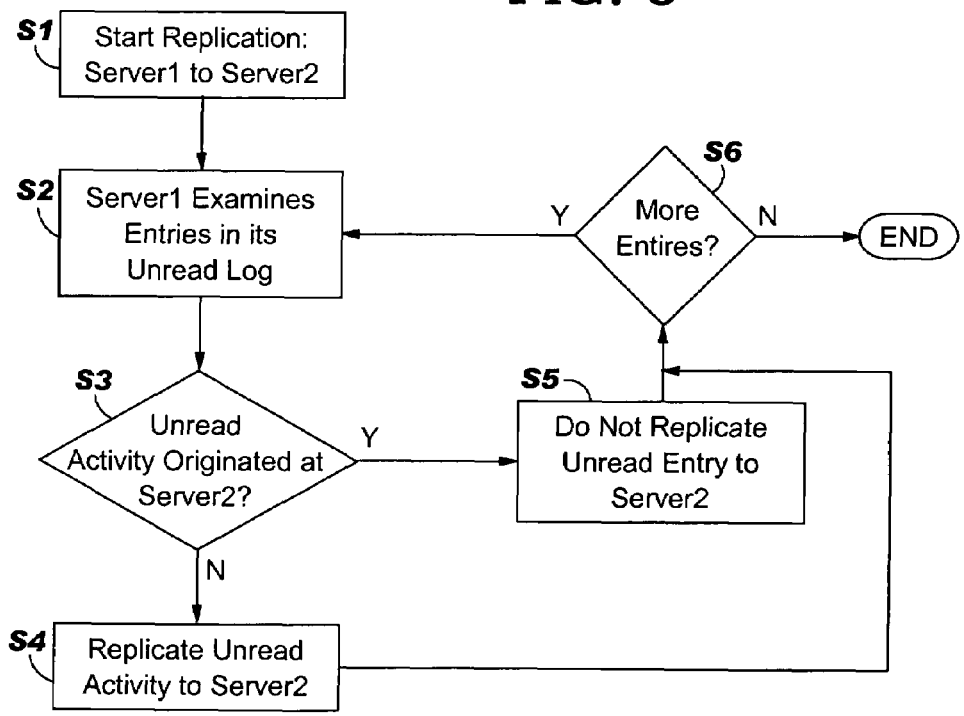

UNREAD MARK REPLICATION BOUNCE-BACK PREVENTION

BACKGROUND OF THE INVENTION

1. Field of the Invention

The present invention generally relates to data storage. More specifically, the present invention provides a method, system, and computer program product for preventing an unread activity, such as an unread mark, from being replicated back (i.e., bounced-back) to an originating server during a replication operation.

2. Background Art

To make a database available to users in different locations, on different networks, or in different time zones, a special type of database copy called a replica can be created. When a change is made to a replica, that change is duplicated to all of the other replicas of the database that have been created. This operation ensures that all users share the same information.

An exemplary server system 10 illustrating a related art replication operation between two servers is illustrated in FIG. 1. It is assumed for the purposes of this description that the reader has an understanding of replication commensurate with one skilled in the art. Accordingly, a detailed description of replication is not provided herein. One system capable of replication is Lotus Domino.

As shown in FIG. 1, a database replica $12_R$ exists on servers $14_1$ and $14_2$. Although shown as including only a pair of database replicas $12_R$ on servers $14_1$ and $14_2$, it should be apparent to those skilled in the art that server system 10 can include additional servers 14 and replicas $12_R$.

Normally, when replication occurs, unread activities (e.g., a user reading new email messages, a user marking email messages Read or Unread, etc.), represented by entries in an unread log $16_1$ in server $14_1$, are replicated from server $14_1$ to server $14_2$ and are added to replica $12_R$. This is indicated by directional arrow $18_{1-2}$ in FIG. 1. When replication subsequently occurs at server $14_2$, the unread activities are replicated back (i.e., bounced-back) to server $14_1$. This is represented by directional arrow $20_{2-1}$ in FIG. 1. This is a redundant step and a wasted transmission because server $14_1$ originated the unread activities. Upon receipt, server $14_1$ discards the duplicate unread activities (i.e., the unread activities that originated at server $14_1$) received from server $14_2$ during replication. Unfortunately, such wasted transmissions reduce the efficiency and performance of the replication operation and waste valuable network and server resources.

In view of the foregoing, there exists a need for a method, system, and program product for optimizing unread replication by preventing an unread activity from being sent back (i.e., bounced-back) to an originating server during a replication operation.

SUMMARY OF THE INVENTION

In general, the present invention provides a method, system, and program product for preventing an unread activity from being sent back (i.e., bounced-back) to an originating server during a replication operation. In accordance with the present invention, during replication, an identification of a originating server is provided for each unread activity, and is stored with the unread entry associated with the unread activity in the unread log of each receiving server. Thus, each receiving server now knows which server originally sent each unread activity. To this extent, unread activities that originated from a given server during replication are not sent back to that server during a subsequent replication operation.

A first aspect of the present invention provides a method for preventing an unread activity from being bounced-back to an originating server during a replication operation, comprising: storing an identification of an originating server of a replicated unread activity, being associated with a read/unread status of an email, in an unread log of a receiving server; during a subsequent replication process initiated by the receiving server, preventing replication of the unread activity back to the originating server; during the subsequent replication process, replicating the unread activity to at least one other server not identified as the originating server; wherein storing an identification further comprises updating the unread log to include an unread log to include an unread entry corresponding to the replicated unread activity, and storing the identification of the originating server with the unread entry; wherein preventing the replication of the unread activity back to the originating server further comprises examining the unread log to determine if any unread entries stored therein correspond to an unread activity received from the originating server and, during the subsequent replication process, not replicating any unread activity identified as being received from the originating server back to the originating server; wherein the originating server has a name, and wherein the identification is a hash of the name of the originating server; and wherein and wherein during the subsequent replication process, if another server has the same hash as the originating server, the receiving server replicates the unread activity to the other server and back to the originating server.

A second aspect of the present invention provides a bounce-back prevention system, comprising: a receiving server including at least one computer, for receiving an unread activity, associated with a read/unread status of an email and replicated by an originating server, the receiving server including an unread log for storing an identification of the originating server: a system for preventing replication of the unread activity back to the originating server during a subsequent replication process initiated by the receiving server; wherein the receiving server further comprises a replication system, and wherein the replication system of the receiving server replicates the unread activity to at least one other server not identified as the originating server during the subsequent replication process; wherein the receiving server further comprises a system for updating the unread log to include an unread entry corresponding to the replicated unread activity, and for storing the identification of the originating server with the unread entry; wherein the system for preventing the replication of the unread activity back to the originating server further comprises a system for examining the unread log to determine if any unread entries stored therein correspond to an unread activity received from the originating server, and a system for preventing any unread activities, identified by the examining system as being received from the originating server, from being replicated back to the originating server, during the subsequent replication process; wherein the originating server has a name, and wherein the identification is a hash of the name of the originating server; and wherein the receiving system includes a replication system, and wherein during the subsequent replication process, if another server has the same hash as the originating server, the replication system of the receiving server replicates the unread activity to the other server and back to the originating server.

A third aspect of the present invention provides a program product stored on a recordable storage medium for preventing an unread activity associated with a read/unread status of an email from being bounced-back to an originating server during a replication operation, which when executed on a computer system comprises; program code for storing an identification of an originating server of a replicated unread activity in an unread log of a receiving server; program code for preventing replication of the unread activity back to the originating server, during a subsequent replication process initiated by the receiving server; program code for replicating the unread activity to at least one other server not identified as the originating server, during the subsequent replication process; wherein the program code for storing an identification further comprises program code for updating the unread log to include an unread entry corresponding to the replicated unread activity, and program code for storing the identification of the originating server with the unread entry; wherein the program code for preventing the replication of the unread activity back to the originating server further comprises program code for examining the unread log to determine if any unread entries stored therein correspond to an unread activity received from the originating server, and program code for preventing replication of any unread activity the examining program code has identified as being received from the originating server back to the originating server, during the subsequent replication process; wherein the originating server has a name, and wherein the identification is a hash of the name of the originating server; and wherein the receiving server further includes program code for replicating the unread activity to the other server and back to the originating server during the subsequent replication process, if another server has the same hash as the originating server.

Therefore, the present invention provides a method, system, program product for preventing an unread activity from being sent back to an originating server during a replication operation.

BRIEF DESCRIPTION OF THE DRAWINGS

These and other features of this invention will be more readily understood from the following detailed description of the various aspects of the invention taken in conjunction with the accompanying drawings in which:

FIGS. 3-5 illustrate a bounce-back prevention operation in accordance with the present invention.

FIG. 6 depicts an exemplary flow diagram illustrating the method steps of the present invention during replication between two servers.

Figures 1, 2A, 2B:
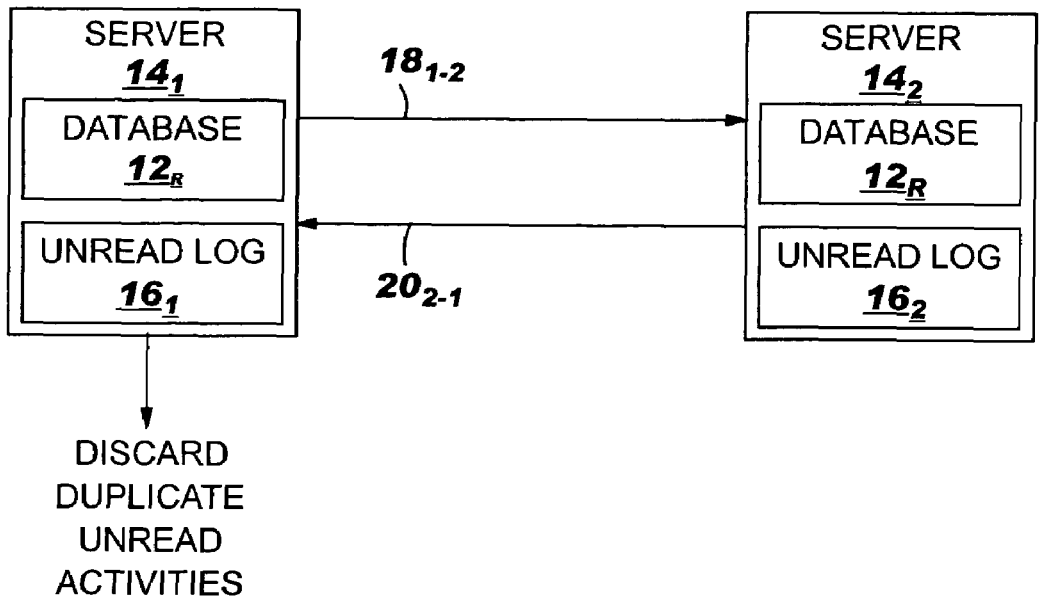
FIG. 1 depicts a replication operation in accordance with the prior art.
FIGS. 2A and 2B depict unread logs with originating server identification.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and program product for preventing an unread activity from being sent back (i.e., bounced-back) to an originating server during a replication operation. In accordance with the present invention, during replication, an identification of a originating server is provided for each unread activity, and is stored with the unread entry associated with the unread activity in the unread log of each receiving server. Thus, each receiving server now knows which server originally sent each unread activity. Accordingly, unread activities that originated from a given server during replication are not sent back to that server during a subsequent replication operation.

The bounce-back prevention method of the present invention is illustrated with reference to FIGS. 2A, 2B, and 3-8. A server including a system for preventing bounce-back of unread activities during a replication operation in accordance with the present invention is illustrated in FIG. 9.

Figure 3:
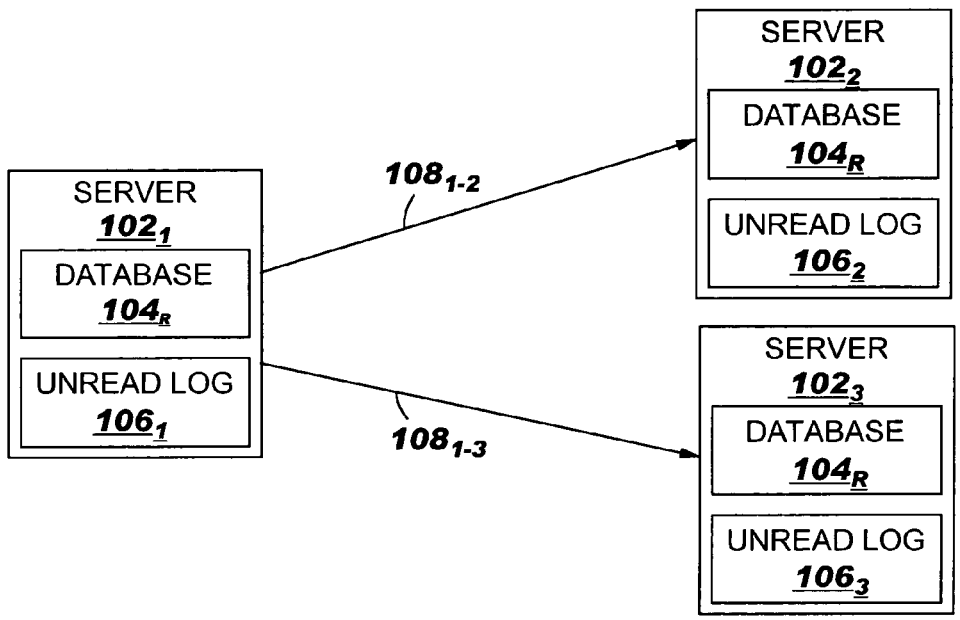
Figure 4:
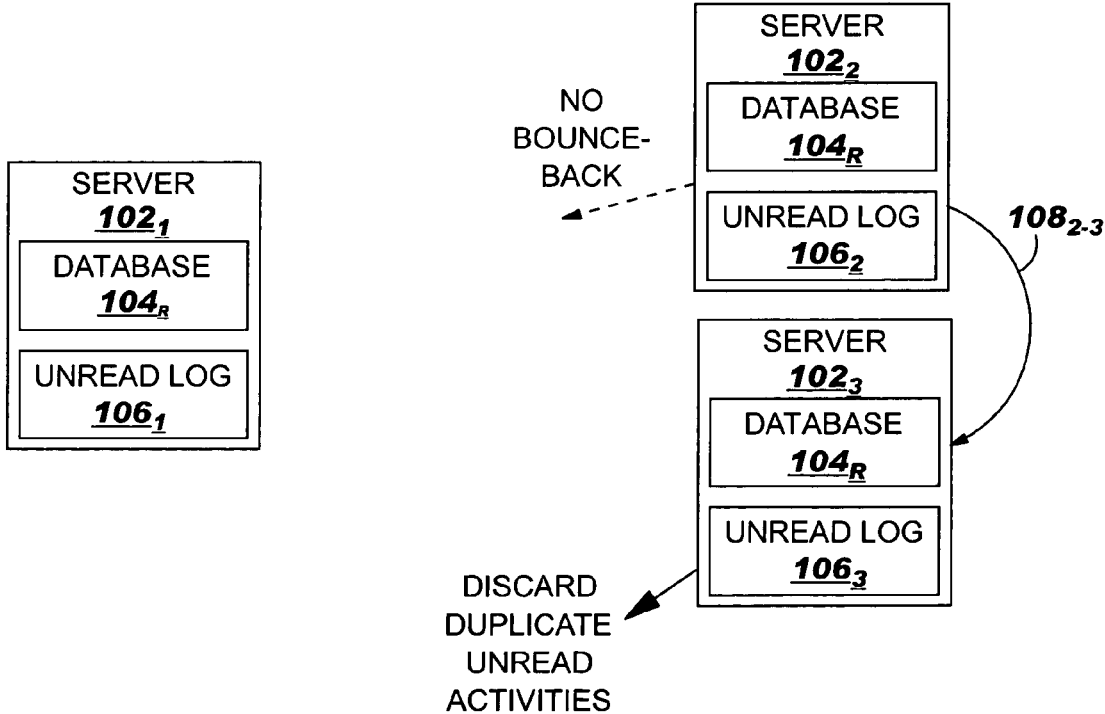

Referring now to FIG. 3, there is illustrated a server system 100 including three servers $102_1$, $102_2$, and $102_3$. A database replica $104_R$ exists on servers $102_1$, $102_2$ and $102_3$. Although shown as including three database replicas $104_R$ stored on three servers $102_1$, $102_2$, $102_3$, it should be apparent to those skilled in the art that the bounce-back prevention method of the present invention can be practiced on server systems having many other server/replica configurations.

When server $102_1$ initiates a replication operation, unread activities (e.g., a user reading new email messages, a user marking email messages Read or Unread, etc.), represented by entries in the unread log $106_1$ in server $102_1$, are replicated from server $102_1$ to servers $102_2$ and $102_3$, and the replicas $104_R$ stored in servers $102_2$ and $102_3$ are updated accordingly. This is indicated by directional arrows $108_{1-2}$ and $108_{1-3}$ in FIG. 3. For simplicity of description, in this example, it is assumed that a single unread activity (i.e., UNREAD ACTIVITY 1) is replicated among the servers $102_1$, $102_2$, and $102_3$.

As shown in FIG. 2A, the unread log $106_2$ of receiving server $102_2$ is updated to include an unread entry 110 corresponding to the replicated unread activity. In addition, an identification 112 (e.g., "SERVER $102_1$") of the originating server $102_1$ of the replicated unread activity is stored with the unread entry 110. The unread log $106_3$ of receiving server $102_3$ is also updated in a similar manner as shown in FIG. 2B. Any type of identification that uniquely identifies the originating server can be used.

When server $102_2$ initiates a subsequent replication operation, it examines its unread log $106_2$ to determine which, if any, of the unread entries 110 in its unread log $106_2$ correspond to unread activities originating from servers $102_1$ or $102_3$. This is accomplished by examining the identification 112 associated with each unread entry 110 in unread log $106_2$. In this example, the only unread entry 110 in the unread log $106_2$ (FIG. 2A) of server $102_2$, is found to have originated from server $102_1$. As such, server $102_2$ will not send the unread activity corresponding to unread entry 110 back to server $102_1$ during replication, thereby preventing bounce-back. Since the unread entry 110 in unread log $106_2$ of server $102_2$ was not identified as originating from server $102_3$, the unread activity corresponding to unread entry 110 (i.e., UNREAD ACTIVITY 1) is replicated to server $102_3$ as indicated by directional arrow $108_{2-3}$ in FIG. 4.

After receipt of the unread activity, server $102_3$ examines unread log $106_3$ to determine if it has already received the unread activity corresponding to unread entry 110 (i.e., UNREAD ACTIVITY 1) from another server. Since the unread activity is identified in unread log $106_2$ (FIG. 2B) as having been previously received from originating $102_1$, server $102_3$ discards the duplicate unread activity previously received from server $102_2$.

When server $102_3$ initiates a subsequent replication operation, it examines its unread log $106_3$ to determine which, if any, of the unread entries 110 in its unread log $106_3$ correspond to unread activities originating from servers $102_1$ and $102_2$. As detailed above, this is accomplished by examining the identification 112 associated with each unread entry 110 in unread log $106_3$. In this example, the only unread entry 110 in unread log $106_3$ (FIG. 2B) of server $102_3$, is found to have originated from server $102_1$. As such, as shown in FIG. 5, server $102_3$ will not send the unread activity corresponding to unread entry 110 back to server $102_1$ during replication, once again preventing bounce-back. However, the unread activity is replicated back to server $102_2$ as indicated by directional arrow $108_{3-2}$ because server $102_2$ was not identified in unread log $106_3$ as the originating server.

It should be noted that server $102_3$ received the same unread activity (UNREAD ACTIVITY 1) from both server $102_1$ (FIG. 3) and server $102_2$ (FIG. 4) in different replication operations. In a first embodiment of the present invention, the identification 112 in unread log $106_3$ corresponding to the unread activity "UNREAD ACTIVITY 1" is set to "SERVER $102_1$" in response to the replication of the unread activity from server $102_1$ to server $102_3$. During the subsequent replication operation from server $102_2$ to $102_3$, the identification 112 in unread log $106_3$ corresponding to "UNREAD ACTIVITY 1" does not change to reflect the fact that the same unread activity was received from server $102_2$ (i.e., it remains "SERVER $102_1$") (see FIG. 2B), thus necessitating the discarding of duplicate unread activities. In a second embodiment of the present invention, the identification 112 in the unread log $106_3$ will identify each of the servers from which the same unread activity was received. To this extent, in the above example, server $102_3$ will not replicate the unread activity to either server $102_2$ or $102_1$, thereby preventing bounce-back of the unread activity to those servers (i.e., multiple levels of bounce-back prevention are provided). Other variations of server identification are also possible. An exemplary flow diagram illustrating the method steps of the present invention during replication between two servers (Server1) and (Server2) is depicted in FIG. 6. Replication is initiated by Server1 in step S1. In step S2, Server1 examines each unread entry in its unread log. In step S3, if an unread entry in Server1's unread log is identified as not originating from Server2, in step S4, the unread activity corresponding to that unread entry is replicated to Server2, else, in step S5, the unread activity is not replicated. If the unread log includes additional unread entries, as determined in step S6, flow returns to step S3, else, the replication operation ends.

As detailed above, an identification of the originating server of a replicated unread activity is stored with the unread entry corresponding to the replicated unread activity. As an optimization to unread log handling and memory utilization, rather than storing the name of the originating server, a 32-bit hash of the server's name is stored in the unread log. Any suitable known hash algorithm can be used to generate the 32-bit hash of each server's name. Using the hash of a server's name to represent the server's identity significantly reduces the amount of space used and eliminates the need for variable length unread log entries. However, the use of a 32-bit hash may create another issue that has to be addressed. In particular, using a hashed server name creates the possibility that there might be a hash collision caused by two server names having the same hashed value. As such, duplication of server name hash values may result in one server not receiving updates originating from another server, thereby resulting in an incomplete unread log. This scenario is illustrated in FIG. 7.

Figure 7:
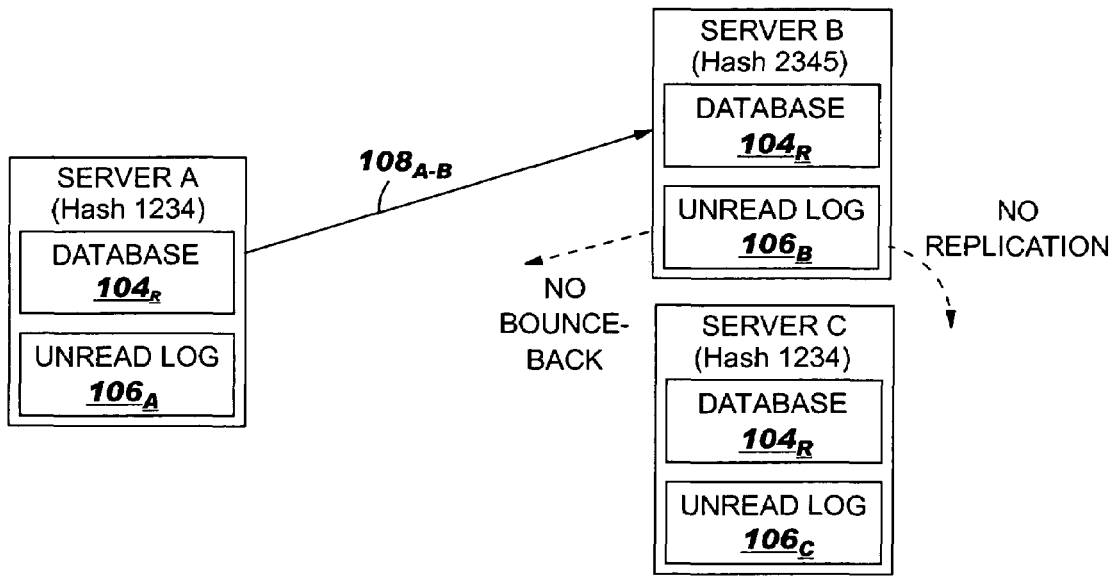
FIGS. 7-8 illustrate another embodiment of a bounce-back prevention operation in accordance with the present invention, wherein a hash ID is used to identify each server.

As shown in FIG. 7, Server A has a hash ID of 1234, Server B has a hash ID of 2345, and Server C has a hash ID of 1234. Assuming that an unread activity has already been replicated from Server A to Server B (as indicated by directional arrow $108_{A-B}$), then a hash ID of 1234, corresponding to the identity of the originating server (i.e., Server A), is stored with the unread entry corresponding to the replicated unread activity in the unread log $106_B$ of Server B. When Server B initiates a subsequent replication, for example, with Server A and Server C, bounce-back of the unread activity to Server A is prevented as desired, because the hash ID stored with the unread entry associated with the unread activity identifies Server A as the originating server. Unfortunately, replication to Server C is also skipped, because the hash ID of Server C matches the hash ID of the originating server (i.e., Server A). As such, the unread log $106_C$ of Server C is incomplete.

Figure 8:
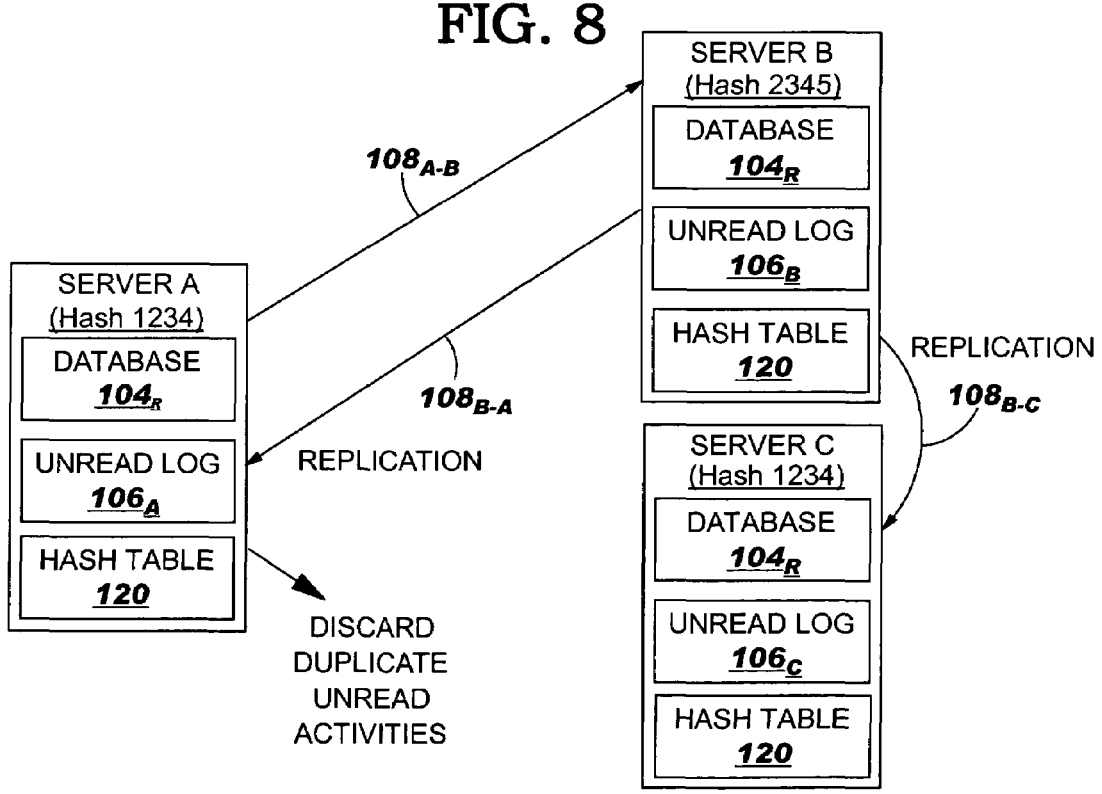
Figure 9:
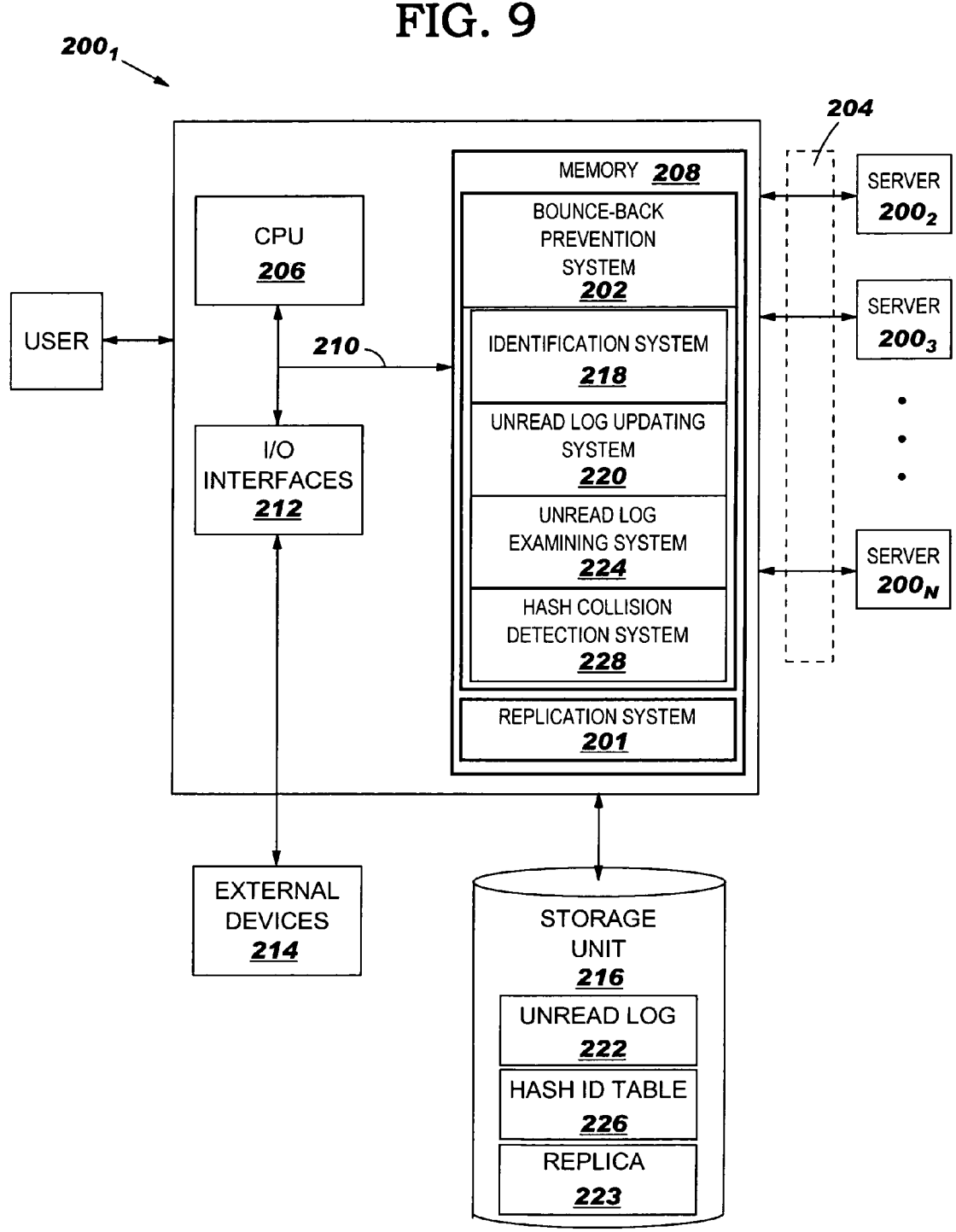
FIG. 9 illustrates a server system including a bounce-back prevention system in accordance with the present invention.

To avoid the above-described problem, as shown in FIG. 8, a table 120 of server names and corresponding hash ID values is stored in each server. During unread replication, the table 120 is checked to detect if any other servers have the same hash ID. If a hash collision occurs, bounce-back prevention is disabled for that server. The use of the table 120 is illustrated in FIG. 8, for the same scenario as that presented above with regard to FIG. 7.

Assuming that an unread activity has already been replicated from Server A to Server B (as indicated by directional arrow $108_{A-B}$), then a hash ID of 1234, corresponding to the identity of the originating server (i.e., Server A), is stored with the unread entry corresponding to the replicated unread activity in the unread log $106_B$ of Server B. When Server B initiates a subsequent replication, for example, with Server A and Server C, it first checks hash table 120 to determine if a hash collision occurs between Server A and Server C. In this case, a hash collision does occur because the hash ID of Server A (1234) is the same as the hash ID of Server C (1234). As such, bounce-back prevention to Server A is disabled, and replication with both Server A and Server C occurs. This ensures that the unread activity is properly replicated to Server C as indicated by directional arrow $108_{B-C}$. Server A, upon receipt of the redundant unread activity (directional arrow $108_{B-A}$), discards the unread activity.

Referring now to FIG. 9, there is illustrated a server $200_1$, including a replication system 201 and a system 202 for preventing bounce-back of unread activities during a replication operation in accordance with the present invention. Server $200_1$ is intended to represent any type of server that is capable of replication with other servers $200_2, 200_3, \ldots 200_N$, across a network 204. Network 204 is intended to represent any type of network over which servers 200 can communicate with each other during replication. For example, network 204 can include the Internet, a wide area network (WAN), a local area network (LAN), a virtual private network (VPN), or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown, server $200_1$ generally includes central processing unit (CPU) 206, memory 208, bus 210, input/output (I/O) interfaces 212 and external devices/resources 214. CPU 206 may comprise a single processing unit, or may be distributed across one or more processing units in one or more locations, e.g., on a client and server. Memory 208 may comprise any known type of data storage and/or transmission media, including magnetic media, optical media, random access memory (RAM), read-only memory (ROM), etc. Moreover, similar to CPU 206, memory 208 may reside at a single physical location, comprising one or more types of data storage, or be distributed across a plurality of physical systems in various forms.

I/O interfaces 212 may comprise any system for exchanging information to/from an external source. External devices/resources 214 may comprise any known type of external device, including speakers, a CRT, LED screen, handheld device, keyboard, mouse, voice recognition system, speech output system, printer, monitor/display, facsimile, pager, etc.

Bus 210 provides a communication link between each of the components in server 200, and likewise may comprise any known type of transmission link, including electrical, optical, wireless, etc. In addition, although not shown, additional components, such as cache memory, communication systems, system software, etc., may be incorporated into server $200_1$. It should be understood that servers $200_2$, $200_3$, ..., $200_N$ typically include components (e.g., CPU, memory, etc.) similar to those described with regard to server $200_1$.

Shown in memory 208 is replication system 201 and system 202 for preventing bounce-back of unread activities during a replication operation. Replication system 201 operates in a known manner to provide replication of unread activities to servers $200_2$, $200_3$, ..., $200_N$. However, the operation of the replication system 201 is controlled by the bounce-back prevention system 202 of the present invention to prevent unread activities from being replicated back to an originating server.

The bounce-back prevention system 202 includes an identification system 218 for identifying the originating server of each unread activity received by server $200_1$ during a replication operation, and an unread log updating system 220 for storing the identity of the originating server with the unread entry corresponding to the received unread activity in the unread log 222 of the server $200_1$.

The unread log 222 and database replica 223, as well as other data required for the practice of the present invention and operation of server $200_1$, are stored in a storage unit 216. Storage unit 216 can be any system capable of providing storage for information, such as unread log 222 and database replica 223 under the present invention. As such, storage unit 216 may reside at a single physical location, comprising one or more types of data storage, or may be distributed across a plurality of physical systems in various forms. In another embodiment, storage unit 216 may be distributed across, for example, a local area network (LAN), wide area network (WAN) or a storage area network (SAN) (not shown).

Bounce-back prevention system 202 further includes an unread log examining system 224. Unread log examining system 224 examines the unread log 222 during a subsequent replication operation initiated by server $200_1$ to determine which, if any, of the unread entries in unread log 222 correspond to unread activities originating from other servers involved in the subsequent replication operation. If unread log examining system 224 determines that one or more unread activities were received from one or more of the servers involved in the subsequent replication operation, those unread activities are not replicated back to those servers. In this manner, bounce-back of the unread activities during replication is prevented.

If the servers are identified using a hash ID, a hash ID table 226 is provided in storage unit 216. The hash ID table 226 contains a list of server names and corresponding hash values (e.g., 32-bit hash), and is provided to each of the servers $200_1$, $200_2$, ..., $200_N$. In addition, bounce-back prevention system 202 includes a hash collision detection system 228 for detecting hash collisions between servers that have the same hash ID and for disabling bounce-back protection in the case that a hash collision is detected.

It should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following:

(a) conversion to another language, code or notation; and/or
(b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. For example, the present invention could be used to prevent bounce-back during replication of other types of time-sequenced activity logs. Such modifications and variations that may be apparent to a person skilled in the art are intended to be included within the scope of this invention as defined by the accompanying claims.

We claim:

1. A method for preventing an unread activity from being bounced-back to an originating server during a replication operation, comprising:

storing an identification of an originating server of a replicated unread activity, the unread activity being associated with a read/unread status of an email, in an unread log of a receiving server;

during a subsequent replication process initiated by the receiving server, preventing replication of the unread activity back to the originating server;

during the subsequent replication process, replicating the unread activity to at least one other server not identified as the originating server;

wherein storing an identification further comprises updating the unread log to include an unread entry corresponding to the replicated unread activity, and storing the identification of the originating server with the unread entry;

wherein preventing the replication of the unread activity back to the originating server further comprises examining the unread log to determine if any unread entries stored therein correspond to an unread activity received from the originating server and, during the subsequent replication process, not replicating any unread activity identified as being received from the originating server back to the originating server, wherein the originating server has a name, and wherein the identification is a hash of the name of the originating server; and wherein during the subsequent replication process, if another server has the same hash as the originating server, the receiving server replicates the unread activity to the other server and back to the originating server.

2. The method of claim 1, wherein the originating server discards any duplicate replicated unread activities.

3. A bounce-back prevention system, comprising:
a receiving server, including at least one computer, for receiving an unread activity, associated with a read/unread status of an email and replicated by an originating server, the receiving server including an unread log for storing an identification of the originating server;
a system for preventing replication of the unread activity back to the originating server during a subsequent replication process initiated by the receiving server;
wherein the receiving server further comprises a replication system, and wherein the replication system of the receiving server replicates the unread activity to at least one other server not identified as the originating server during the subsequent replication process;
wherein the receiving server further comprises a system for updating the unread log to include an unread entry corresponding to the replicated unread activity, and for storing the identification of the originating server with the unread entry;
wherein the system for preventing the replication of the unread activity back to the originating server further comprises a system for examining the unread log to determine if any unread entries stored therein correspond to an unread activity received from the originating server, and a system for preventing any unread activities, identified by the examining system as being received from the originating server, from being replicated back to the originating server, during the subsequent replication process;
wherein the originating server has a name, and wherein the identification is a hash of the name of the originating server; and
wherein the receiving system includes a replication system, and wherein during the subsequent replication process, if another server has the same hash as the originating server, the replication system of the receiving server replicates the unread activity to the other server and back to the originating server.

4. The system of claim 3, wherein the originating server discards any duplicate replicated unread activities.

5. A program product stored on a recordable storage medium for preventing an unread activity associated with a read/unread status of an email from being bounced-back to an originating server during a replication operation, which when executed on a computer system comprises:
program code for storing an identification of an originating server of a replicated unread activity in an unread log of a receiving server;
program code for preventing replication of the unread activity back to the originating server, during a subsequent replication process initiated by the receiving server;
program code for replicating the unread activity to at least one other server not identified as the originating server, during the subsequent replication process;
wherein the program code for storing an identification further comprises program code for updating the unread log to include an unread entry corresponding to the replicated unread activity, and program code for storing the identification of the originating server with the unread entry;
wherein the program code for preventing the replication of the unread activity back to the originating server further comprises program code for examining the unread log to determine if any unread entries stored therein correspond to an unread activity received from the originating server, and program code for preventing replication of any unread activity the examining program code has identified as being received from the originating server back to the originating server, during the subsequent replication process;
wherein the originating server has a name, and wherein the identification is a hash of the name of the originating server; and
wherein the receiving server further includes program code for replicating the unread activity to the other server and back to the originating server during the subsequent replication process, if another server has the same hash as the originating server.

6. The program product of claim 5, wherein the originating server includes program code for discarding any duplicate replicated unread activities.

* * * * *